United States Patent [19]

Imai

[11] Patent Number: 4,490,034

[45] Date of Patent: Dec. 25, 1984

[54] APPARATUS FOR CORRECTING AN UNEVENNESS IN AN INTENSITY OF ILLUMINATION OF AN ORIGINAL IN A COPYING MACHINE CAPABLE OF VARIABLE MAGNIFICATION

[75] Inventor: Hidekazu Imai, Kanagawa, Japan

[73] Assignee: Fuji Xerox Co., Ltd., Tokyo, Japan

[21] Appl. No.: 459,553

[22] Filed: Jan. 20, 1983

[30] Foreign Application Priority Data

Feb. 23, 1982 [JP] Japan ................................ 57-27701

[51] Int. Cl.[3] ............................................ G03B 27/70

[52] U.S. Cl. .................................................... 355/57

[58] Field of Search ............................... 355/8, 57, 71

[56] References Cited

U.S. PATENT DOCUMENTS

| | | | |
|---|---|---|---|
| 3,917,393 | 11/1975 | Nier | 355/57 X |
| 3,999,850 | 12/1976 | Komori et al. | 355/57 X |
| 4,380,390 | 4/1983 | Tateoka et al. | 355/71 |
| 4,402,595 | 9/1983 | Ogawa et al. | 355/8 |
| 4,411,514 | 10/1983 | Komori et al. | 355/8 X |
| 4,426,153 | 1/1984 | Libby et al. | 355/57 X |

*Primary Examiner*—L. T. Hix
*Assistant Examiner*—Della J. Rutledge
*Attorney, Agent, or Firm*—Sughrue, Mion, Zinn, Macpeak & Seas

[57] ABSTRACT

A copying machine capable of producing variable magnifications has an in-mirror lens and a light for nonuniformly illuminating an original. A stationary member is interposed between the in-mirror lens and a mirror which reflects an image to a photosensitive material. The member has a cut-out portion at an upper edge end thereof so that the member is able to regulate the effective luminous flux transmitted to the sensitive material so that the amount of effective luminous flux transmitted to the sensitive material is maintained substantially uniform along a longitudinal direction thereof at all magnifications of the copier.

2 Claims, 4 Drawing Figures

APPARATUS FOR CORRECTING AN UNEVENNESS IN AN INTENSITY OF ILLUMINATION OF AN ORIGINAL IN A COPYING MACHINE CAPABLE OF VARIABLE MAGNIFICATION

BACKGROUND OF THE INVENTION

1. Field of the Invention

The present invention relates to an apparatus for correcting an unevenness in an intensity of illumination of an image produced by a copying machine capable of producing variable magnification images.

2. Description of the Prior Art

In an optical slit type exposure copying machine, an unevenness in the intensity of illumination occurs in a longitudinal direction of an optical slit. The unevenness varies in proportion to the fourth power of the cosine of $\omega$, where $\omega$ is the half view angle of a lens.

In order to solve the problem created by the nonuniform illumination, conventionally two methods have been used. The first method compensates for the varying light distribution generated by a light source which is used to illuminate an original in such a way as to compensate for the reduced intensity of illumination of an image of the original which passes through opposite longitudinal sections of said longitudinal optical slit. The second method is to vary the width of the optical slit along the longitudinal direction thereof.

However, in a copying machine with a variable magnification, when the magnification is varied, the rate of the unevenness in the intensity of illumination along the longitudinal direction of the optical slit also varies because the half angle of view on the picture surface varies. FIG. 1 is a view which explains this. FIG. 1 shows the distribution of the intensity of illumination on the picture surface using a conventional copying machine illumination means. In FIG. 1, reference numeral 20 denotes a curve which shows an illumination distribution for a reducing magnification. In this case, the illumination intensity is high at the peripheral longitudinal positions of the longitudinal optical slit. Accordingly, when copying, the density of the copy is uneven. That is, the density at the peripheral part of the copy is thin. To the contrary, reference numeral 21 denotes a distribution of an illumination intensity for an enlarging magnification. In this case, the illumination intensity is low at the peripheral longitudinal portions of the longitudinal optical slit. Accordingly, when copying, a fog is created at the peripheral parts of the copy.

To solve these problems, a number of members, one member for each different magnification of the copier, are provided for regulating the luminous flux of light and for partially interrupting the passage of light. These numerous members for regulating the luminous flux of light are chosen and driven in such a way that the width of the optical slit is varied, thereby compensating for the unevenness in the intensity of illumination on the picture surface.

However, the cost for the means to individually drive the plurality of members as well as the cost of the plurality of members themselves is very high. In addition, the optical means is also required to be large.

SUMMARY OF THE INVENTION

The present invention is intended to solve the problems set forth above. According to the present invention, an apparatus is disclosed for correcting an unevenness in an intensity of illumination of an original for various magnifications. The apparatus of the invention has a high reliability. This object is achieved by providing a member for regulating the luminous flux of light between the in-mirror lens and a sensitive material.

DESCRIPTION OF THE PREFERRED EMBODIMENTS

In a copying machine capable of producing variable magnifications utilizing a slit exposure optical system, an in-mirror lens 1 moves parallel with the surface of an original 3 (in the direction indicated by the arrow (X) in FIG. (2) and also in a vertical direction (in the direction indicated by the arrow (Y) in FIG. (2).

Figure 2:
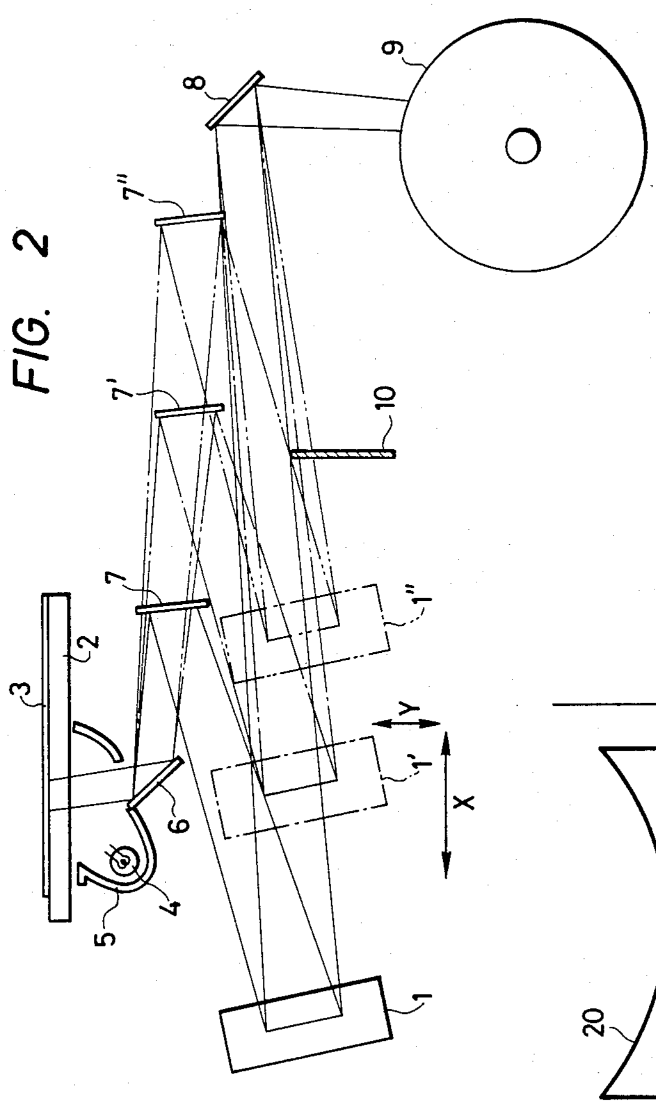
FIG. 2 is an explanatory view of an optical system of the copying machine having a variable magnification constructed in accordance with an embodiment of the present invention.
Figure 1:
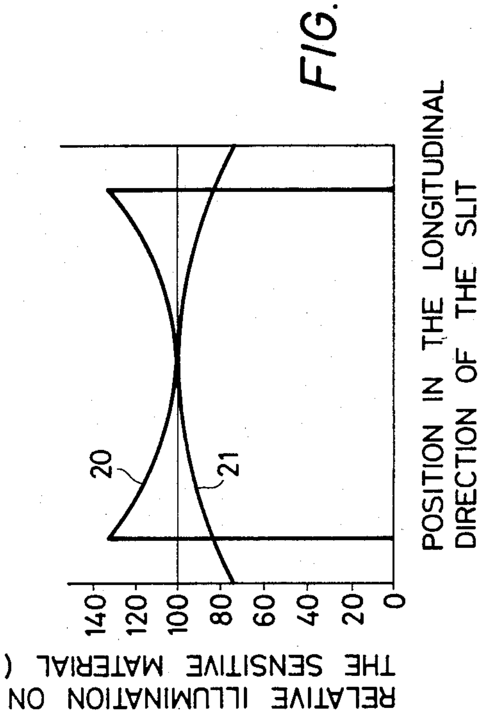
FIG. 1 is a graph showing the distribution of the intensity of illumination on a surface of a photosensitive material when a system for illuminating an original in a conventional copying machine is applied to a copying machine having a variable magnification.

FIG. 2 is an explanatory view of an embodiment of an optical system of a copying machine capable of producing variable magnifications. In FIG. 2, light originating from a lamp 4 directly illuminates an original 3 along with light reflected by a reflection member 5. The light which is reflected from the original 3 is further reflected by first and second mirrors 6 and 7 towards the in-mirror lens 1. Then, the light which is reflected towards the in-mirror lens 1 is further reflected from the in-mirror lens 1 and a third mirror 8 to expose a photosensitive material 9.

In the copying machine of FIG. 2 the relationship between the magnification $\beta$ and the in-mirror lens 1 position is as follows:

$$a = \frac{(1+\beta)}{\beta} f$$

where (a) is the distance between the surface of the original 3 and the in-mirror lens 1, and (f) is the focal distance of the in-mirror lens 1. Furthermore, the relationship between the magnification $\beta$ and the optical path distance (b) which is the distance between the surface of the original 3 and the picture surface of the sensitive material 9 is as follows:

$$b = \frac{(1+\beta)^2}{\beta} f$$

Therefore, the lengths of the optical paths (a) and (b) and the position of the lens 1 vary depending upon the magnification chosen. The lengths of the optical paths are varied by varying the position of the second mirror 7 and the position of the lens 1.

In FIG. 2, the positions of the second mirror 7 and the in-mirror lens 1 correspond to an enlarging magnification ($\beta > 1$ where 1 represents a life-size magnification). The second mirror 7 and the in-mirror lens 1 are positioned at 1′ and 7′ respectively to obtain life-size or unity magnification ($\beta = 1$), while these elements are positioned at 1″ and 7″, respectively to obtain a reducing magnification ($\beta > 1$).

In this case, the path of the effective luminous flux reflected from the in-mirror lens 1 towards the mirror 8 moves downwards in the direction (a) in FIG. 2 as the magnification is reduced.

Accordingly, the unevenness in the intensity of illumination can be corrected by providing a member for regulating the luminous flux so that the member interrupts a portion of the luminous flux along the path referred to above at a constant vertical distance below the picture surface. It should be noted that the longitudinal direction of the slit extends perpendicular to the plane of FIG. 2.

Since the length of the optical path is varied as the magnification is varied, the half angle $\theta$ of view for the lens to view the surface of the original 3 is also varied.

If the half angle of view at the time of enlarging is represented by $\theta_1$, the half angle of view at the time of unity magnification by $\theta_2$, and the half angle of view at the time of reducing by $\theta_3$, it can readily be determined that $\theta_1 > \theta_2 > \theta_3$. Therefore, the variance in the illumination intensity along the longitudinal direction of the lens 1, which is parallel to the longitudinal direction of the optical slit and accordingly perpendicular to the plane of FIG. 2, increases as the magnification increases.

In a copying machine capable of variable magnifications inclusive of an enlarging magnification, according to the present invention, the original is illuminated in such a manner so that the illumination intensity at the marginal parts of the surface of the original automatically corrects for the $\cos^4$ variation described above when the magnification of the copier is set to its maximum value. Accordingly, the maximum enlarging magnification is used as the reference. At this maximum magnification, no further correction is required to obtain proper exposure of the sensitive material 9.

Figure 3:
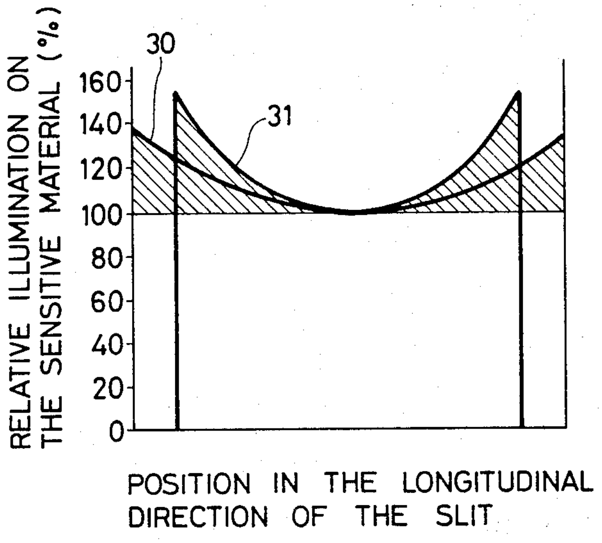
FIG. 3 is a graph showing the distribution of the intensity of illumination on the surface of the sensitive material based on a variance in the half angle of field when the magnification is varied.

When the original 3 is thus illuminated, the illumination intensity along the longitudinal direction of the optical slit of the picture surface, though constant at the maximum magnification, begins to vary, with the amount of variance increasing, as the magnification is reduced. FIG. 3 illustrates the large unevenness in illumination which occurs for a life-size magnification 30 and a reduced magnification 31. In FIG. 3, the distribution of the intensity of illumination at the time of reducing, is shown. This figure clearly shows that for all magnifications which are less than the maximum magnification, the peripheral parts of the optical slit are overly illuminated.

Accordingly, a single member 10, viewed from the side, for regulating the luminous flux between the lens 1 and the sensitive material 9 is fixedly secured at a predetermined position and is provided in order to correct the increase in the intensity of illumination at the peripheral parts for all reduced magnifications.

Figure 4:
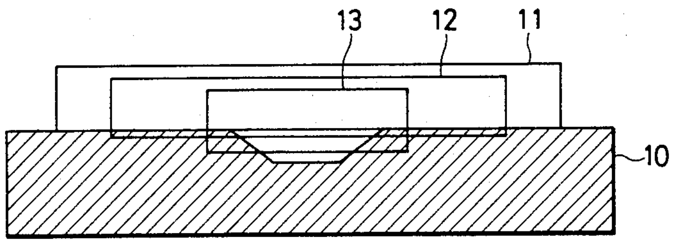
FIG. 4 is a view showing the cross section of the luminous flux of light which is interrupted by the member for regulating the luminous flux of light at several variable magnifications.

FIG. 4 is a front view of the member 10 of FIG. 2 showing a cross section of a luminous flux which is interrupted by means of the member 10 for regulating the luminous flux at various magnifications. In FIG. 4, reference numerals 11, 12 and 13 respectively show the cross sections of effective luminous fluxes at the time of enlarging, at the time of unity magnification and at the time of reducing. FIG. 4 clearly shows the flux of light is not interrupted during a maximum magnification while it is for all other magnifications. The path of the effective luminous flux between the lens 1 and the mirror 8 moves downward in the direction (Y) in FIG. 2 as the magnification is decreased. The effective luminous fluxes can readily be regulated by the member 10 by forming a slit having predetermined dimensions in a center portion along the upper edge thereof.

In accordance with the present embodiment, the maximum enlarging magnification is made the reference. The member 10 regulates the luminous flux as indicated by the slanted lines in FIG. 4, so that the effective luminous flux is regulated when the magnification is less than the reference. Hence, there is provided a configuration in such a way that more light is interrupted at the peripheral parts in the longitudinal direction of the slit as the magnification is reduced, thereby correcting the unevenness in the intensity of illumination due to the variance of the magnification.

In accordance with the present invention, it is possible to obtain a uniform intensity of illumination on the picture surface at a maximum magnification and also at reduced magnifications without increasing the intensity of illumination at the marginal parts of the sensitive material as the magnification is reduced. Therefore, it is possible to obtain a copy having a uniform density and high quality at all magnifications.

What is claimed is:

1. A copying machine capable of producing variable magnifications and having an in-mirror lens, comprising:

means for illuminating an original so that an image thereof passes through a longitudinal optical slit of said copying machine wherein said illumination means illuminates said original non-uniformly in a longitudinal direction which is parallel to said longitudinal direction of said optical slit so that marginal portions of said original are illuminated more than a center portion of said original;

means for reflecting said image which passes through said longitudinal optical slit to said in-mirror lens and then to a photo-sensitive material;

means for regulating an effective flux of light transmitted to said photo-sensitive material along a longitudinal direction thereof which is parallel to a longitudinal direction of said optical slit, said regulating means being interposed fixedly at a predetermined position between said photo-sensitive material and said in-mirror lens, said regulating means decreasing an effective luminous flux transmitted to said photo-sensitive material along said longitudinal direction at a predetermined magnification above unity and less than a predetermined maximum of said copying machine wherein said regulating means comprises a member fixedly located so that a front surface of said member faces said in-mirror lens, said front surface having a cut-out portion at a center part thereof along an upper edge of said member so that peripheral longitudinal sections of said upper edge of said member interrupt a portion of said effective luminous flux passing between said in-mirror lens and said photo-sensitive material at said predetermined magnification.

2. The copying machine as claimed in claim 1 wherein said member is located such that said effective luminous flux transmitted to said photo-sensitive material is substantially uniform along said longitudinal direction of said photo-sensitive material at all magnifications of said copier.

* * * * *